US012572603B1

(12) United States Patent
Schmidt-Karaca

(10) Patent No.: US 12,572,603 B1
(45) Date of Patent: Mar. 10, 2026

(54) GENERATIVE ARTIFICIAL INTELLIGENCE (GAI) REUSE SERVICE FOR INTEGRATION OF GAI INTO APPLICATION SCENARIOS

(71) Applicant: SAP SE, Walldorf (DE)

(72) Inventor: Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/938,349

(22) Filed: Nov. 6, 2024

(51) Int. Cl.
*G06F 16/903* (2019.01)
*G06F 16/22* (2019.01)
*G06F 16/93* (2019.01)

(52) U.S. Cl.
CPC .... *G06F 16/90344* (2019.01); *G06F 16/2237* (2019.01); *G06F 16/2282* (2019.01); *G06F 16/93* (2019.01)

(58) Field of Classification Search
CPC ........... G06F 16/90344; G06F 16/2237; G06F 16/2282; G06F 16/93
See application file for complete search history.

(56) References Cited

U.S. PATENT DOCUMENTS

| | | | | |
|---|---|---|---|---|
| 12,316,585 | B1 * | 5/2025 | Eapen ................ | G06Q 10/0635 |
| 2024/0121125 | A1 * | 4/2024 | Blair ..................... | G06F 40/263 |
| 2024/0403328 | A1 * | 12/2024 | Hecht ................... | G06F 16/285 |
| 2025/0045256 | A1 * | 2/2025 | Gottlob ................. | G06F 16/211 |
| 2025/0077487 | A1 * | 3/2025 | Groenewegen ....... | G06F 16/215 |
| 2025/0123814 | A1 * | 4/2025 | Mcmorran ................ | G06F 8/75 |
| 2025/0148542 | A1 * | 5/2025 | Natesan ................. | G06N 20/00 |

* cited by examiner

*Primary Examiner* — Dangelino N Gortayo
(74) *Attorney, Agent, or Firm* — Fish & Richardson P.C.

(57) ABSTRACT

Methods, systems, and computer-readable storage media for receiving a scenario service request for a scenario of an application, determining a scenario flowchain represented in the scenario service request, retrieving a scenario flowchain configuration of the scenario flowchain from a database, the scenario flowchain configuration including a data object that defines a set of steps that are to be executed in an order, each step being associated with a step type and a set of parameters, executing steps in the set of steps, where at least one step is executed to prompt a large language model (LLM), and returning a result to the application, the result comprising a response from the LLM that is responsive to the prompt.

20 Claims, 4 Drawing Sheets

*300*

Receive scenario call ⟍ *302*

Retrieve scenario flowchain configuration ⟍ *304*

Determine steps of flowchain ⟍ *306*

Execute steps of flowchain ⟍ *308*

Return result ⟍ *310*

GENERATIVE ARTIFICIAL INTELLIGENCE (GAI) REUSE SERVICE FOR INTEGRATION OF GAI INTO APPLICATION SCENARIOS

BACKGROUND

Enterprises continuously seek to improve and gain efficiencies in their operations. To this end, enterprises employ software systems to support execution of operations. Enterprises integrate systems in the domain of so-called intelligent enterprise, which can employ artificial intelligence (AI) that can include, for example, machine learning (ML) models. For example, AI can be used for data analytics and/or automating tasks in support of enterprise operations.

In the field of AI, so-called generative AI (GAI) has recently seen an explosion in popularity. GAI can be described as including so-called foundation models that generate content based on training data. For example, foundation models can include large language models (LLMs), which are a form of GAI that can be used to generate text for a variety of use cases.

As intelligent enterprise evolves, enterprises look to leverage the power of GAL. This can include integrating GAI into so-called scenarios. A scenario can be described as defining a context of an application that leverages GAI by embedding a sequence of GAI-related steps in one or more tasks executed by the application. However, integrating GAI into enterprise platforms is a non-trivial task. For example, GAI can present various technical challenges and can have disadvantages that have to be managed.

SUMMARY

Implementations of the present disclosure are directed to integration of generative artificial intelligence (GAI) into scenarios of applications executed by enterprises. More particularly, implementations of the present disclosure are directed to a GAI reuse service that provides time- and resource-efficient integration of GAI using scenario flowchains.

In some implementations, actions include receiving a scenario service request for a scenario of an application, determining a scenario flowchain represented in the scenario service request, retrieving a scenario flowchain configuration of the scenario flowchain from a database, the scenario flowchain configuration including a data object that defines a set of steps that are to be executed in an order, each step being associated with a step type and a set of parameters, executing steps in the set of steps, where at least one step is executed to prompt a large language model (LLM), and returning a result to the application, the result comprising a response from the LLM that is responsive to the prompt. Other implementations of this aspect include corresponding systems, apparatus, and computer programs, configured to perform the actions of the methods, encoded on computer storage devices.

These and other implementations can each optionally include one or more of the following features: actions further include, in response to determining that a step is associated with a similarity search step type, executing the step to query a vector database using an input vector, receive one or more strings from the vector database, and provide the one or more strings as input to a subsequent step for generating a prompt template by, at least in part, populating placeholders of the prompt template with the one or more string; the vector database records vector-string pairs provided from a knowledgebase representative of the scenario, the knowledgebase including a table including a first column storing data values representative of a first aspect of the scenario and a second column storing data values representative of a second aspect of the scenario, the second aspect resolving the first aspect; actions further include, in response to determining that a step is associated with a retrieval augmented generation (RAG) step type, executing the step to query a RAG system using an input vector, receive one or more document chunks from the RAG system, and provide the one or more document chunks as input to a subsequent step for generating a prompt template by, at least in part, populating placeholders of the prompt template with the one or more document chunks; actions further include, during a design-time, receiving user input defining the scenario and the scenario flowchain configuration, and storing the scenario flowchain configuration in one or more tables of the database; actions further include, during a design-time, receiving user input defining modifications to a default scenario flowchain configuration to provide the scenario flowchain configuration, and storing the scenario flowchain configuration in one or more tables of the database; and the scenario service request is received through a call using a uniform resource locator (URL) of a scenario flowchain run-time system that executes the scenario flowchain.

The present disclosure also provides one or more computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and one or more computer-readable storage media coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
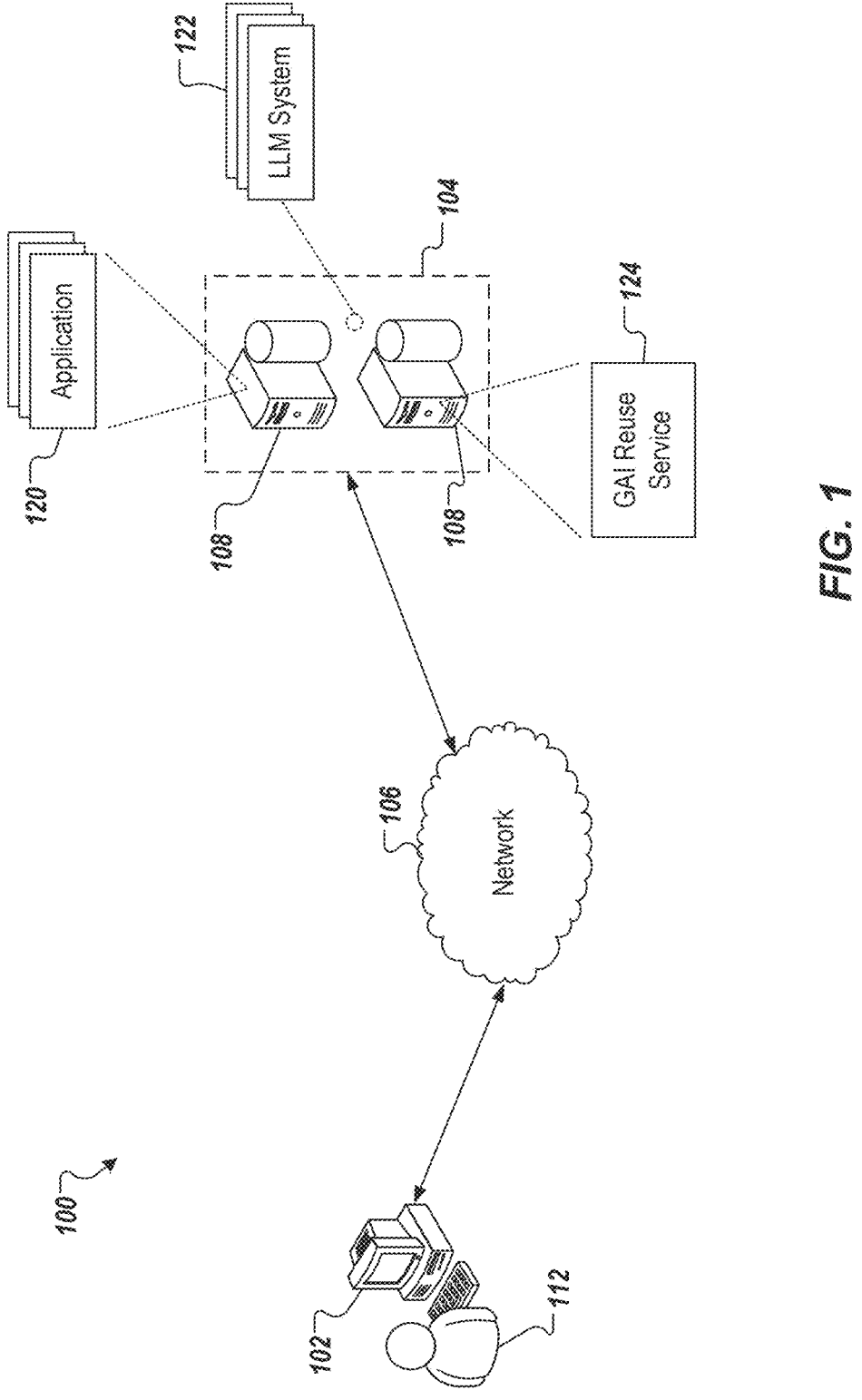
FIG. 1 depicts an example architecture that can be used to execute implementations of the present disclosure.

Implementations of the present disclosure are directed to integration of generative artificial intelligence (GAI) into scenarios of applications executed by enterprises. More particularly, implementations of the present disclosure are directed to a GAI reuse service that provides time- and resource-efficient integration of GAI using scenario flowchains. Implementations can include actions of receiving a scenario service request for a scenario of an application, determining a scenario flowchain represented in the scenario service request, retrieving a scenario flowchain configuration of the scenario flowchain from a database, the scenario flowchain configuration including a data object that defines a set of steps that are to be executed in an order, each step being associated with a step type and a set of parameters, executing steps in the set of steps, where at least one step is executed to prompt a large language model (LLM), and returning a result to the application, the result comprising a response from the LLM that is responsive to the prompt.

To provide further context for implementations of the present disclosure, and as introduced above, in the field of AI, so-called GAI has recently seen an explosion in popularity. GAI can be described as including so-called foundation models that generate content based on training data. For example, foundation models can include LLMs, which are a form of GAI that can be used to generate text for a variety of use cases.

As intelligent enterprise evolves, enterprises look to leverage the power of GAL. This can include integrating GAI into so-called scenarios. A scenario can be described as defining a context of an application that leverages GAI by embedding a sequence of GAI-related steps in one or more tasks executed by the application. However, integrating GAI into enterprise platforms is a non-trivial task. For example, GAI can present various technical challenges and can have disadvantages that have to be managed.

In further detail, using GAI in the context of an application can be relatively complex. For example, this can include scenarios that are more than just using a GAI-based chatbot to ask questions to and receive answers. In many cases, the result coming from the GAI model (e.g., LLM) needs to be integrated with the other application data and the input prompt can be filled in by the application itself, instead of coming from the GAI model. For example, an example scenario can include resolving errors that arise in execution of an application. Each error can be unique and be resolved in a specific way for a respective context.

Getting high-quality and reliable answers depends on various factors that are specific to the context of each scenario. This can include, for example, generating prompts (the input to the GAI model), retrieving and integrating appropriate context data (e.g., querying a vector database, querying a knowledgebase for retrieval augmented generation (RAG)), and accessing services for prompting the GAI model. Accordingly, each use case that leverages GAI is unique, where specific problems need specific prompts, prompt templates, context data, and the like.

One way to address this diversity is to code the sequence of prompts and data retrieval for each of the respective use cases. However, this not only requires developer skills, time, and resources, but also distracts from the actual task that is executed using underlying knowledge (e.g., how a particular error is resolved). Having to program every approach to try out how the response from the GAI model can be made more precise and reliable not only involves handover cycles between product owners as well as understanding the requirements of the enterprise, but also requires developers to code the approaches, which requires storage and maintenance of the code. This is inefficient in terms of time and technical resources (e.g., processors, memory) to generate, store, and maintain the code (e.g., debug, update). Further, because there can be at least partial overlap between scenarios, code duplication can result, which injects further technical inefficiencies (e.g., generating, storing, and maintaining redundant versions of code).

In view of the above context, implementations of the present disclosure provide a GAI reuse service that is based on scenario flowchains. As described in further detail herein, the GAI reuse service of the present disclosure enables resource-efficient alignment and configuration of scenario flowchains (which are made up of flowchain steps) for each scenario and generically executes scenario flowchains. That is, the GAI reuse service is not specific to (is agnostic to) respective scenarios. In some implementations, a design-time tool is provided that enables tasks to be performed, such as scenario flowchain editing and testing to be performed. To integrate GAI models with applications, each application connects to the GAI reuse service (e.g, using a uniform resource loactor (URL)), and the GAI reuse service enables one or GAI models to be promoted and provide responses for scenarios of the application. As described herein, the GAI reuse service of the present disclosure minimizes code duplication, streamlines integration processes, and enables applications to stay up-to-date with changes in GAI strategy in a time- and resource-efficient manner.

Implementations of the present disclosure are described in further detail herein with reference to example GAI models, which include LLMs. It is contemplated, however, that implementations of the present disclosure can be realized with any appropriate GAI model (e.g., text generation, image generation, audio generation, video generation) or any appropriate combination of GAI models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host one or more applications 120 that execute tasks (e.g., as part of workflows) in support of enterprise operations. One or more scenarios can arise in each of the applications 120, which is to be addressed. An example scenario can include, without limitation, an error handling scenario, in which an error arises in the application 120 and is to be resolved. In handling scenarios, the applications 120 can leverage one or more GAI models, such as LLMs provisioned within LLM systems 122 hosted within the server system 104. For example, and in the example case of error handling, the application 120 can query (prompt) a LLM of a LLM system 122 for a description of how to resolve the error. In accordance with implementations of the present disclosure, a GAI reuse service 124 can be provisioned within the server system 104, which enables time- and resource-efficient integration of GAI with scenarios of the applications 120. Example LLMs can include, but are not limited to, Gemini-1.0-pro, gemini-1.5-flash, gemini-1.5-pro, gpt-35-turbo, gpt-35-turbo-16k, gpt-4, gpt-4-32k, gpt-4o, mistralai—mixtral-8x7b-instruct-v01, meta—llama3-70b-instruct, meta—llama3.1-70b-instruct, anthropic—claude-3-sonnet, anthropic—claude-3-haiku, anthropic—claude-3-opus, anthropic—claude-3.5-sonnet, amazon—titan-embed-text, amazon—titan-text-lite, amazon—titan-text-express, text-embedding-ada-002, text-embedding-3-small, text-embedding-3-large, text-bison, chat-bison, textembedding-gecko, and textembedding-gecko-multilingual.

Figure 2:
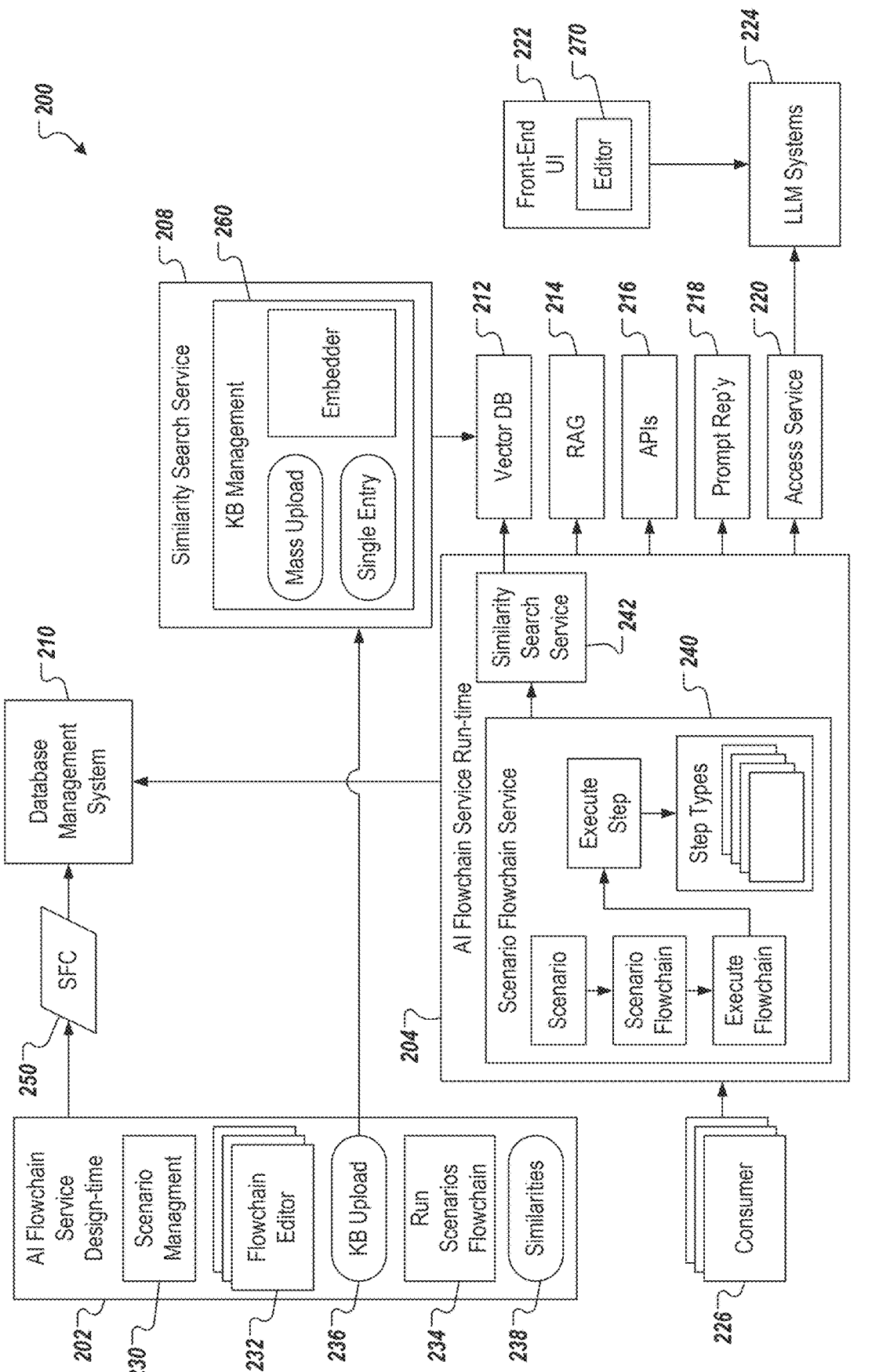
FIG. 2 depicts an example architecture that includes a generative artificial intelligence (GAI) reuse service in accordance with implementations of the present disclosure.

FIG. 2 depicts an example conceptual architecture 200 including a GAI reuse service in accordance with implementations of the present disclosure. In the depicted example, the example conceptual architecture 200 includes an AI flowchain service design-time system 202, an AI flowchain service run-time system 204, a similarity search service 208, a database management system 210, a vector database (DB) 212, a RAG system 214, an API component 216, a prompt template repository 218, an access service 220, a front-end UI 222, one or more LLM systems 224 (e.g., the LLM systems 122 of FIG. 1), and one or more consumers 226 (e.g., the applications 120). In some implementations, the GAI reuse service of the present disclosure (e.g., the GAI reuse service 124 of FIG. 1) includes the AI flowchain service design-time system 202 and the AI flowchain service run-time system 204.

In some examples, the AI flowchain service design-time system 202 includes a scenario management component 230, one or more scenario flowchain editors 232, a run scenario flowchain component 234, a knowledgebase (KB) upload store 236, and a similarities store 238. In some examples, the AI flowchain service run-time system 204 includes a scenario flowchain service 240 and a similarity search service 242. In some examples, scenario flowchain configurations 250 are generated and stored in the database management system 210. In some examples, the similarity search service 208 includes a knowledgebase (KB) management system 260. In some examples, the front-end UI 222 includes an editor 270.

In some implementations, the GAI reuse service of the present disclosure enables one or more scenario flowchains for respective scenarios that are to be handled by an application, such as a consumer 226. In some examples, a scenario defines the context of an application that needs to embed a sequence of AI steps and can have descriptive data for administration. In some examples, for each scenario, a specific service URL is created and can be called by applications to leverage a LLM of the one or more LLM systems 224. For example, when calling the URL, an application includes an input string. As described in further detail herein, the GAI reuse service processes the input string to prompt a LLM and return a resolution as output.

In some implementations, each scenario includes a scenario flowchain that defines a sequence of steps for processing an input string to provide a resolution. In some examples, a scenario flowchain can be provided as a graph (e.g., directed graph). In some examples, each step consumes input and provides an output (e.g., a string variable). In some examples, one or more steps can consume the output of one or more previous steps as input. In some examples, each step can be of a step type, each step type determining one or more AI actions that are to be performed. Each AI action is generic (e.g., not specific to a respective scenario) and can be executed through a call to a respective API. However, AI actions can be made scenario-specific based on values of a set of mandatory parameters and a set of optional parameters.

An example scenario flowchain can be provided as follows:
1. Receive service call (from application).
2. Execute similarity search.
3. Generate prompt.
4. Call LLM through API.
5. Receive output.
6. Return response to service call.

In the above example, the similarity search, in which contextual data is retrieved based on input of the service call and is used in generating the prompt. It can also be noted that the above example is a relatively simple example. For example, other example scenario flowchains can include multiple rounds of prompt generation and calls to LLMs and/or the output of one LLM being used as input to another step in the scenario flowchain.

Referring again to FIG. 2, the AI flowchain service design-time 202 is used to manage the scenarios and the scenario flowchains (e.g., using the scenario management component 230). For example, a UI can be provided, through which one or more users can define a scenario represented within a scenario flowchain configuration 250, which defines and configures a scenario flowchain (e.g., using a scenario flowchain editor 232). In some examples, defining can include defining steps in a scenario flowchain and configuration can include, for each step, defining step type, setting parameters values, defining step sequence, and defining input/output variables. In some examples, each step type can have a common set of parameters that define a sequence and a flow of variables. For example, using "next step" parameters, a sequence of the steps are defined. Each step can produce output variables that can be input to any subsequent step. Predecessor steps can be declared as mandatory when their output variables are to be used be a subsequent step.

Example step types can include, service input, service output, similarity search, prompt generation, prompting, API call, decision, RAG, and knowledge graph. In some examples, service input maps input received from a consumer to an output parameter. In some examples, service output maps an input parameter with results of previous steps to the output. In some examples, similarity search searches for strings determined to be relevant to the input, the strings being provided from a knowledgebase, as described in further detail herein. In some examples, a string is provided as a string of text. A result of a similarity search step is provided as input to the prompt generation step. In some examples, prompt generation uses a prompt template that includes one or more placeholders (e.g., indicated with { } within the prompt template) that are filled in with values from previous steps. For example, a result of a similarity search can be used to populate one or more placeholders within a prompt template to be used as, for example, context for the prompt. A result of prompt generation is a prompt that is provided as input to the prompting step. In some examples, prompting includes prompting a LLM of a LLM system 224 using the prompt (e.g., through an API call to the LLM system 224).

In some examples, API call can be used to call one or more services for ancillary data that can be used. For example, the ancillary data can be provided to prompt generation for populating placeholders of the prompt template to generate the prompt. In some examples, prompt templates can be associated with unique prompt template identifiers (e.g., which can be used to retrieve the prompt templates from the prompt template repository 218). In some examples, decision can introduce one or more logical conditions that can be used to fork a scenario flowchain. For example, a decision step can receive input from a predecessor step and, in response to one or more values of the input, can provide output to either a first subsequent step or a second subsequent step.

In some examples, RAG can be performed to retrieve documents that can be used to provide context for prompts and/or to ground responses from the LLM systems 224. For example, documents (e.g., structured, unstructured) that are relevant to a scenario can be processed through the RAG system 214 and can be split into segments, referred to as chunks. For each chunk, an embedder generates a vector (also referred to as an embedding) that is a multi-dimensional, numeric representation of the chunk. Here, vector-chunk pairs are stored. As described in further detail herein, the RAG system 214 can be queried to identify chunks that might be relevant to a particular scenario. For example, data representative of a scenario can be processed through an embedder to provide an input vector that can be used to query (e.g., through an API call to the RAG system 214). Querying can include identifying vectors stored within the RAG system 214 that are sufficiently similar to the input vector (e.g., within a threshold cosine distance of the input vector), and returning chunks from the respective vector-chunk pairs. In some examples, a chunk includes a plaintext entry of a document. In some examples, a location (e.g., URL) of the document can be returned.

In some examples, chunks and/or documents returned from the RAG system 214 can be used as context for prompts, which can ground LLM responses. For example, the chunks and/or documents can be used to populate placeholders of a prompt template in generating a prompt. In this manner, the LLM is provided with real-world context to improve the accuracy of response and avoid issues, such as hallucination.

In some examples, a knowledge graph (KG) can be queried to provide knowledge data that can be used to provide context for prompts and/or to ground responses from the LLM systems 224. For example, the KG contains semantically related context data that can be retrieved by traversing the KG (e.g., using SPARQL). The knowledge data that is returned can be input as context to the prompt that is used to prompt the LLM systems 224. In some examples, the knowledge data is returned from the KG as the path length when traversing from an anchor node (as part of the input or at least in relation to the input) and the nodes related to it within the KG.

In some examples, each scenario flowchain configuration 250 is stored in the database management system 210. For example, the scenario flow configuration 250 can be stored in one or more tables as table entries, each scenario flowchain configuration 250 being associated with a scenario that is uniquely identified using a scenario identifier (scenario ID). Accordingly, the scenario ID can be used as a key to query the one or more tables for the scenario flowchain configuration 250 of the respective scenario. As described in further detail herein, the AI flowchain service run-time can read scenario flowchain configurations 250 for execution of respective scenario flowchains.

In some examples, the AI flowchain service design-time 202 provides a test environment (e.g., through the run scenario flowchain component 234). For example, testing a scenario flowchain can include providing an input to an input field, the input representing input that would be passed to the AI flowchain service run-time 204 from a consumer 226, calling the AI flowchain service run-time 204, which uses the current configuration and displays an output in an output field. The parameters of the scenario flow chain can be fine-tuned and adjusted and the direct impact of each adjustment can be directly checked through repeated testing.

In some implementations, the similarity search service 208 generates vector-document pairs that can be stored in the vector database 212. More particularly, for each scenario, a knowledgebase upload 236 can be uploaded to the similarity search service 208. In some examples, the knowledgebase upload 236 includes a set of string pairs that are relevant to a respective scenario. The upload can be for single pairs or as a bulk upload (e.g., based on .csv file upload). In some examples, string pairs are representative of a scenario. For example, in a scenario for error resolution, a string pair can include a string representative of an error (e.g., error identifier, error type) and a string representative of a resolution (e.g., a textual description, a URL to a document) that can be used to resolve the error. As another example, in a scenario for matching questions to answers, a string pair can include a string representative of question and a string representative of an answer to the question.

In some implementations, the knowledgebase management system 260 processes the knowledgebase uploads to provide vector-string pairs. In some examples, a string of a string pair can be processed by an embedder that generates a vector (also referred to as an embedding) that is a multi-dimensional, numeric representation of the string. The vector can be tied to the other string of the string pair in a vector-string pair that is stored in the vector database 212. As described in further detail herein, during run-time, the vector database 212 can be queried using an input vector that is generated using a string representative of a scenario (e.g., by the embedder). Querying of the vector database 212 can include identifying vectors stored within the vector database 212 that are sufficiently similar to the input vector (e.g., within a threshold cosine distance of the input vector), and returning strings from the respective vector-string pairs. For example, and in the example scenario of resolving errors, the input vector can be representative of an error that a consumer 226 is requesting to be resolved and the strings that are returned are descriptive of resolutions to errors that are determined to be sufficiently similar to the error.

In some implementations, the AI flowchain service run-time 204 executes scenarios responsive to requests received from consumers 226. For example, and as discussed herein, a consumer 226 can call the AI flowchain service run-time 204 (e.g., through the URL) and the call can include data and can indicate a scenario that is being requested. In the example scenario of error resolution, the data can include error type, software version error occurred in, hardware details, and the like. In some examples, the call can indicate the scenario by scenario ID. For example, for each scenario that can be encountered by a consumer and that is to be handled by the GAI reuse system, the consumer is provided with a respective scenario ID. In this manner, when the scenario is encountered by the consumer, the respective scenario ID can be used to inform the GAI reuse service, which scenario flowchain is to be executed.

In some implementations, the AI flowchain service run-time 204 queries the database management system 210 for the scenario flowchain configuration 250 of the respective scenario. In some examples, the scenario flowchain service 240 reads the configuration for the scenario to evaluate the scenario flowchain and execute the scenario flowchain by executing the steps recursively. In some examples, execution of a step can include checking the step type as defined in the configuration and executes the step per parameters of the step type (e.g., which prompt template to use, which LLM to prompt). For example, for similarity search, the step calls the similarity search service 242 and includes data relevant to the scenario. In some examples, an input vector is generated based on the data (e.g., the data is processed through an embedder) and the input vector is used to query the vector database, which returns one or more strings. In some examples, output of the similarity search step is input to a prompt generation step, the one or more string being used in prompt generation to populate placeholders within a prompt template to generate a prompt. As another example, for RAG, an input vector is generated based on the data (e.g., the data is processed through an embedder) and the input vector is used to query a document vector database, which returns one or more documents (or segments of documents). In some examples, output of the RAG step is input to a prompt generation step, the one or more string being used in prompt generation to populate placeholders within a prompt template to generate a prompt.

Figure 3:
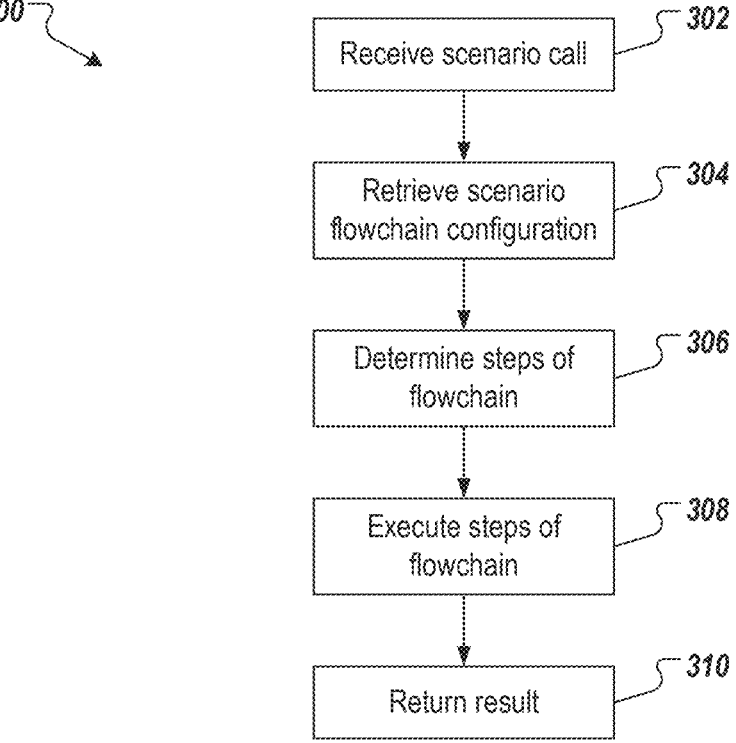
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A scenario call is received (302). For example, and as described herein, a consumer 226 can call the AI flowchain service run-time 204 (e.g., through the URL) and the call can include data and can indicate a scenario that is being requested. A scenario flowchain configuration is retrieved (304). For example, and as described herein, the AI flowchain service run-time 204 queries the database management system 210 for the scenario flowchain configuration 250 of the respective scenario.

Steps of the flowchain are determined (306) and steps of the flowchain are executed (308). For example, and as described herein, the scenario flowchain service 240 reads the configuration for the scenario to evaluate the scenario flowchain and execute the scenario flowchain by executing the steps recursively. In some examples, execution of a step can include checking the step type as defined in the configuration and executing the step per parameters of the step type (e.g., which prompt template to use, which LLM to prompt, similarity search, RAG). For example, for similarity search, the step calls the similarity search service 242 and includes data relevant to the scenario. In some examples, an input vector is generated based on the data (e.g., the data is processed through an embedder) and the input vector is used to query the vector database, which returns one or more strings. In some examples, output of the similarity search step is input to a prompt generation step, the one or more string being used in prompt generation to populate placeholders within a prompt template to generate a prompt. As another example, for RAG, the RAG system 214 can be queried to identify chunks that might be relevant to a particular scenario. For example, data representative of a scenario can be processed through an embedder to provide an input vector that can be used to query (e.g., through an API call to the RAG system 214). In some examples, chunks and/or documents returned from the RAG system 214 can be used as context for prompts, which can ground the input to the LLM to factually accurate examples. For example, the chunks and/or documents can be used to populate place-holders of a prompt template in generating a prompt. In this manner, the LLM is provided with real-world context to improve the accuracy of response and avoid issues, such as hallucination.

A result is returned (310). For example, and as described herein, the AI flowchain service run-time 204 returns a result to the consumer 226 that originated execution of the scenario flowchain. In some examples, the result can include one or more responses from one or more LLMs of the LLM systems 224.

Implementations of the present disclosure provide multiple technical improvements and/or advantages in integration of AI for use in scenarios of applications. For example, after an idea of where AI can be leveraged in the context of an application, a scenario with a scenario flowchain can be created, configured, and tested using the GAI reuse service of the present disclosure without any changes to the application itself. The complete scenario flowchain can be setup and tested with real-world input that would be expected to come from the application and the output put can be evaluated as to whether expectations are met in terms of, for example, quality and usefulness. The scenario flowchain can be adjusted (e.g., adding a RAG step) to improve results until the scenario flowchain is determined to meet expectations. This is all achieved without modifying the application. As another example, the GAI reuse service of the present disclosure can function as a development accelerator. For example, developers of applications can ideate scenarios for leveraging AI and can test the scenarios without any modification to code of the applications. As another example, after it is determined to leverage the GAI reuse system with an application, modification of the application is limited to inserting a service call into the code of the application, which is trivial. In this manner, when a scenario is encountered, the application invokes a service call to the GAI reuse service is invoked and returns a response.

As still another example, the GAI reuse service of the present disclosure can function as an extensibility tool for AI. For example, the AI service flowchain design-time can be made available to customers (e.g., consumers of the applications), which can access default scenario flowchain configurations and modify scenario flowchain configurations to for specificity to the requirements of the customers (e.g., adding customer-specific prompt templates). Hooks in the code (i.e., the places where the AI flowchain scenario is called) are already prepared. Through modification of the flowchains, the behavior can be adopted to customer needs.

Figure 4:
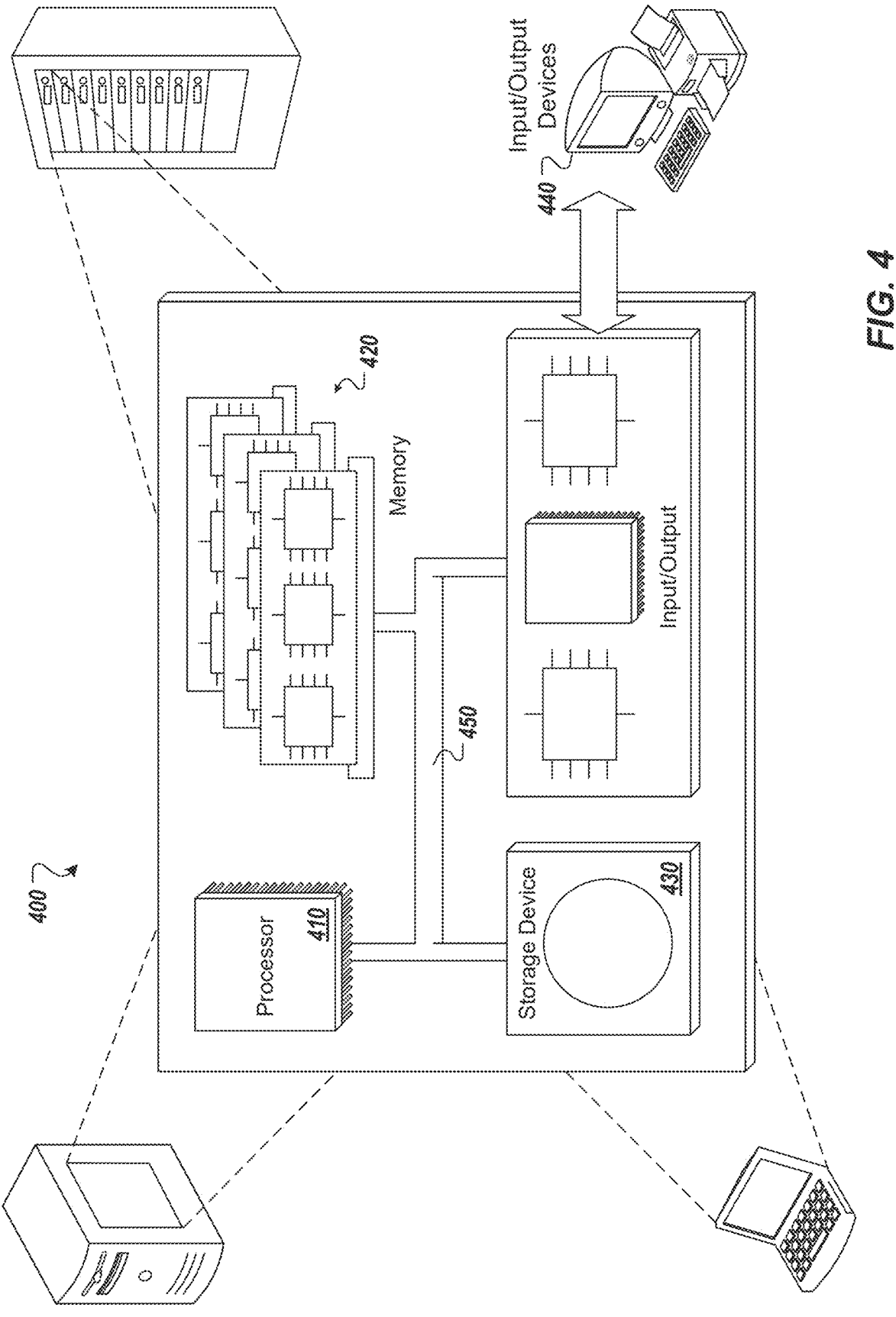
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for integrating artificial intelligence (AI) responsive to scenarios arising in execution of applications, the method being executed by one or more processors and comprising:

receiving a scenario service request for a scenario of an application;

determining a scenario flowchain represented in the scenario service request;

retrieving a scenario flowchain configuration of the scenario flowchain from a database, the scenario flowchain configuration comprising a data object that defines a set of steps that are to be executed in an order, each step being associated with a step type and a set of parameters, each step type determining one or more AI actions that are to be performed, each set of parameters comprising one or more mandatory parameters and one or more optional parameters for execution of the respective step;

executing steps in the set of steps, where at least one step is executed to prompt a large language model (LLM); and returning a result to the application, the result comprising a response from the LLM that is responsive to the prompt.

2. The method of claim 1, further comprising, in response to determining that a step is associated with a similarity search step type, executing the step to:

query a vector database using an input vector;

receive one or more strings from the vector database; and provide the one or more strings as input to a subsequent step for generating a prompt template by, at least in part, populating placeholders of the prompt template with the one or more string.

3. The method of claim 2, wherein the vector database records vector-string pairs provided from a knowledgebase representative of the scenario, the knowledgebase comprising a table comprising a first column storing data values representative of a first aspect of the scenario and a second column storing data values representative of a second aspect of the scenario, the second aspect resolving the first aspect.

4. The method of claim 1, further comprising, in response to determining that a step is associated with a retrieval augmented generation (RAG) step type, executing the step to:

query a RAG system using an input vector;

receive one or more document chunks from the RAG system; and provide the one or more document chunks as input to a subsequent step for generating a prompt template by, at least in part, populating placeholders of the prompt template with the one or more document chunks.

5. The method of claim 1, further comprising, during a design-time:

receiving user input defining the scenario and the scenario flowchain configuration; and storing the scenario flowchain configuration in one or more tables of the database.

6. The method of claim 1, further comprising, during a design-time:

receiving user input defining modifications to a default scenario flowchain configuration to provide the scenario flowchain configuration; and storing the scenario flowchain configuration in one or more tables of the database.

7. The method of claim 1, wherein the scenario service request is received through a call using a uniform resource locator (URL) of a scenario flowchain run-time system that executes the scenario flowchain.

8. A non-transitory computer-readable storage medium coupled to one or more processors and having instructions stored thereon which, when executed by the one or more processors, cause the one or more processors to perform operations for integrating artificial intelligence (AI) responsive to scenarios arising in execution of applications, the operations comprising:

receiving a scenario service request for a scenario of an application;

determining a scenario flowchain represented in the scenario service request;

retrieving a scenario flowchain configuration of the scenario flowchain from a database, the scenario flowchain configuration comprising a data object that defines a set of steps that are to be executed in an order, each step being associated with a step type and a set of parameters, each step type determining one or more AI actions that are to be performed, each set of parameters comprising one or more mandatory parameters and one or more optional parameters for execution of the respective step;

executing steps in the set of steps, where at least one step is executed to prompt a large language model (LLM); and returning a result to the application, the result comprising a response from the LLM that is responsive to the prompt.

9. The non-transitory computer-readable storage medium of claim 8, wherein operations further comprise, in response to determining that a step is associated with a similarity search step type, executing the step to:

query a vector database using an input vector;

receive one or more strings from the vector database; and provide the one or more strings as input to a subsequent step for generating a prompt template by, at least in part, populating placeholders of the prompt template with the one or more string.

10. The non-transitory computer-readable storage medium of claim 9, wherein the vector database records vector-string pairs provided from a knowledgebase representative of the scenario, the knowledgebase comprising a table comprising a first column storing data values representative of a first aspect of the scenario and a second column storing data values representative of a second aspect of the scenario, the second aspect resolving the first aspect.

11. The non-transitory computer-readable storage medium of claim 8, wherein operations further comprise, in response to determining that a step is associated with a retrieval augmented generation (RAG) step type, executing the step to:

query a RAG system using an input vector;

receive one or more document chunks from the RAG system; and provide the one or more document chunks as input to a subsequent step for generating a prompt template by, at least in part, populating placeholders of the prompt template with the one or more document chunks.

12. The non-transitory computer-readable storage medium of claim 8, wherein operations further comprise, during a design-time:

receiving user input defining the scenario and the scenario flowchain configuration; and storing the scenario flowchain configuration in one or more tables of the database.

13. The non-transitory computer-readable storage medium of claim 8, wherein operations further comprise, during a design-time:

receiving user input defining modifications to a default scenario flowchain configuration to provide the scenario flowchain configuration; and storing the scenario flowchain configuration in one or more tables of the database.

14. The non-transitory computer-readable storage medium of claim 8, wherein the scenario service request is received through a call using a uniform resource locator (URL) of a scenario flowchain run-time system that executes the scenario flowchain.

15. A system, comprising:

a computing device; and a computer-readable storage device coupled to the computing device and having instructions stored thereon which, when executed by the computing device, cause the computing device to perform operations for integrating artificial intelligence (AI) responsive to scenarios arising in execution of applications, the operations comprising:

receiving a scenario service request for a scenario of an application;

determining a scenario flowchain represented in the scenario service request;

retrieving a scenario flowchain configuration of the scenario flowchain from a database, the scenario flowchain configuration comprising a data object that defines a set of steps that are to be executed in an order, each step being associated with a step type and a set of parameters, each step type determining one or more AI actions that are to be performed, each set of parameters comprising one or more mandatory parameters and one or more optional parameters for execution of the respective step;

executing steps in the set of steps, where at least one step is executed to prompt a large language model (LLM); and returning a result to the application, the result comprising a response from the LLM that is responsive to the prompt.

16. The system of claim 15, wherein operations further comprise, in response to determining that a step is associated with a similarity search step type, executing the step to:

query a vector database using an input vector;

receive one or more strings from the vector database; and provide the one or more strings as input to a subsequent step for generating a prompt template by, at least in part, populating placeholders of the prompt template with the one or more string.

17. The system of claim 16, wherein the vector database records vector-string pairs provided from a knowledgebase representative of the scenario, the knowledgebase comprising a table comprising a first column storing data values representative of a first aspect of the scenario and a second column storing data values representative of a second aspect of the scenario, the second aspect resolving the first aspect.

18. The system of claim 15, wherein operations further comprise, in response to determining that a step is associated with a retrieval augmented generation (RAG) step type, executing the step to:

query a RAG system using an input vector;

receive one or more document chunks from the RAG system; and provide the one or more document chunks as input to a subsequent step for generating a prompt template by, at least in part, populating placeholders of the prompt template with the one or more document chunks.

19. The system of claim 15, wherein operations further comprise, during a design-time:

receiving user input defining the scenario and the scenario flowchain configuration; and storing the scenario flowchain configuration in one or more tables of the database.

20. The system of claim 15, wherein operations further comprise, during a design-time:

receiving user input defining modifications to a default scenario flowchain configuration to provide the scenario flowchain configuration; and storing the scenario flowchain configuration in one or more tables of the database.

* * * * *